United States Patent [19]
Godeau et al.

[11] Patent Number: 5,989,006
[45] Date of Patent: Nov. 23, 1999

[54] DEVICE FOR SHAPING A DUCT OF PLASTIC MATERIAL OR MATERIAL THAT IS ELASTICALLY DEFORMABLE

[75] Inventors: Denis Godeau, Vieilles Maisons; Anthony Garcia, Villemandeur, both of France

[73] Assignee: Hutchinson, France

[21] Appl. No.: 08/884,608

[22] Filed: Jun. 30, 1997

Related U.S. Application Data

[63] Continuation of application No. 08/552,654, Nov. 3, 1995, abandoned.

[30] Foreign Application Priority Data

Nov. 4, 1994 [FR] France .................................. 94 13190

[51] Int. Cl.[6] ...................................................... F16L 3/00
[52] U.S. Cl. ................... 425/392; 138/106; 138/DIG. 8; 248/74.4
[58] Field of Search ............................ 425/392; 138/106, 138/DIG. 8; 248/74.4

[56] References Cited

U.S. PATENT DOCUMENTS

| | | | |
|---|---|---|---|
| 3,471,110 | 10/1969 | Mack | 248/74.4 |
| 3,765,629 | 10/1973 | Voelker et al. | 248/74.4 |
| 3,843,083 | 10/1974 | Angibaud | 248/74.4 |
| 4,258,515 | 3/1981 | Owen | 138/106 |
| 4,669,757 | 6/1987 | Bartholomew | 138/DIG. 8 |
| 4,791,963 | 12/1988 | Gronert et al. | 138/106 |
| 5,088,672 | 2/1992 | Neuendorf et al. | 248/74.4 |
| 5,435,506 | 7/1995 | Wiley | 248/74.4 |

FOREIGN PATENT DOCUMENTS

| | | |
|---|---|---|
| 1 341 140 | 9/1963 | France . |
| E-92 686 | 6/1968 | France . |
| 1 559 036 | 1/1969 | France . |
| 1 009 534 | 7/1964 | United Kingdom . |
| 2 149 000 | 6/1985 | United Kingdom . |

*Primary Examiner*—James P. Mackey
*Attorney, Agent, or Firm*—Fulbright & Jaworski L.L.P.

[57] ABSTRACT

A device for shaping a duct made of plastics material or of deformable elastic material comprises two half-cages molded out of rigid plastics material and fastened together by resilient snap-fastening or hooking, the two half-cages when assembled together defining between them a housing that has the shape which is to be imparted to a portion of the duct. The invention is particularly suitable for mounting ducts of relatively large diameter in the engine compartments of motor vehicles.

9 Claims, 2 Drawing Sheets

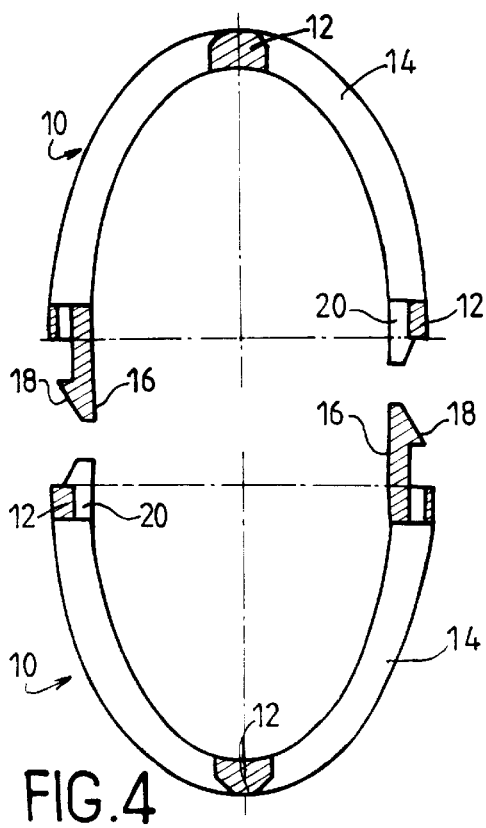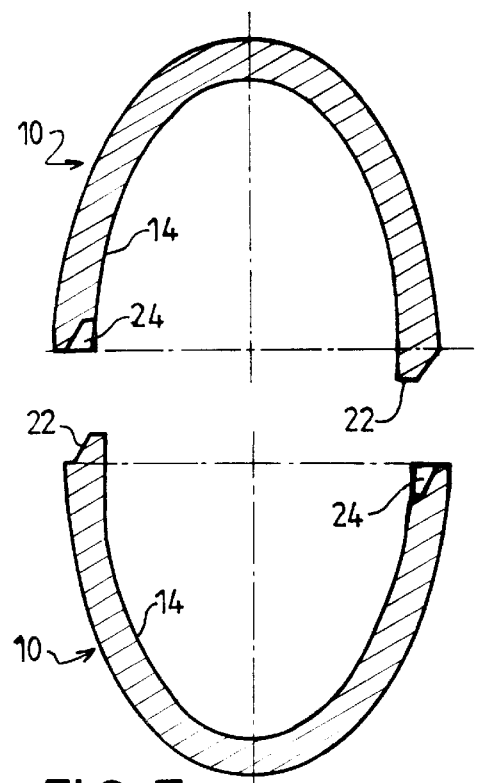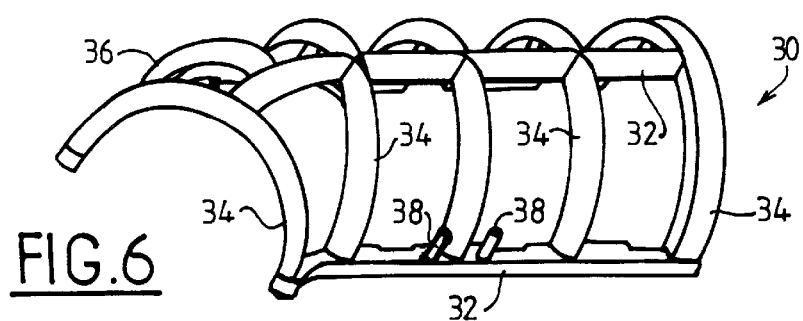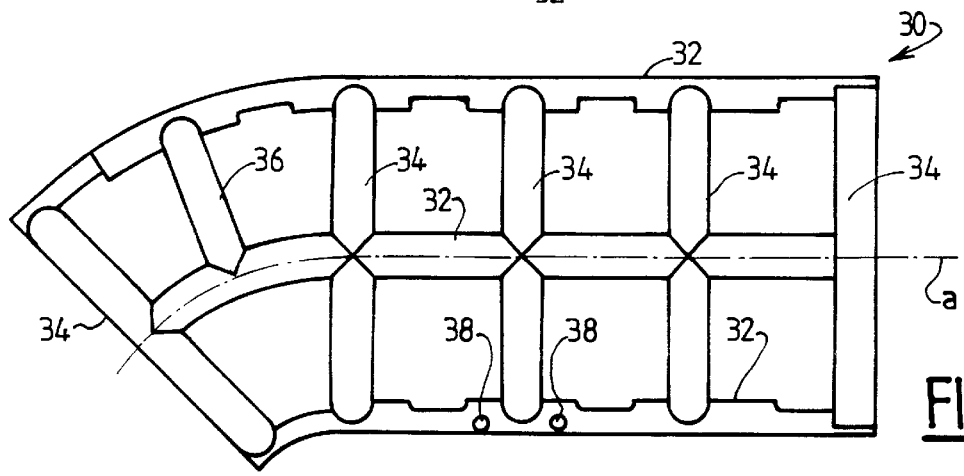

DEVICE FOR SHAPING A DUCT OF PLASTIC MATERIAL OR MATERIAL THAT IS ELASTICALLY DEFORMABLE

This application is a continuation of application Ser. No. 08/552,654, filed Nov. 3, 1995, now abandoned.

The invention relates to device for shaping a duct or a pipe of a plastics material or of a material that is elastically deformable, such as an elastomer or a rubber, the duct or pipe being of a type that is suitable for use, in particular, in the automobile industry.

BACKGROUND OF THE INVENTION

Ducts or pipes of relatively large diameter which are mounted in the engine compartments of motor vehicles often need to be provided with shaping devices enabling their section shape to be modified, in particular for flattening purposes, and/or enabling their direction to be modified, e.g. in order to pass round an obstacle, with the need of such devices being due essentially to the lack of space available within the engine compartment, thus requiring certain portions of ducts or of pipes to be bent and flattened in order to make it possible to house them in the desired locations.

At present, such shaping devices are made of rigid plastics material overmolded on the ducts or pipes, thereby giving rise to problems that can be complex. Solid cores need to be placed inside the ducts during overmolding of the above-specified devices and they can be very difficult to remove after overmolding.

OBJECTS AND SUMMARY OF THE INVENTION

An object of the invention is to provide a solution to those problems that is simple, effective, and cheap.

An object of the invention is to provide a device for shaping a duct or a pipe that is capable of being mounted at any time and on any portion of the duct or pipe so as to change the shape and/or direction thereof, which device is also suitable for being removed and does not require the use of special tools either for being put into place or for being removed.

To this end, the invention provides a device for shaping a duct of plastics material or of elastically deformable material, the device comprising at least two rigid pieces provided with means for fastening one to the other and designed to be assembled together so as to define between them a housing for receiving a portion of the above-mentioned duct, said housing being of a shape that corresponds to the shape desired for said portion of the duct.

Advantageously, the means for fastening the pieces together are resilient snap-fastening or hooking means.

It thus suffices to install the pieces on either side of the duct at the desired location and to fix them together, in particular by resilient snap-fastening or mutual engagement, thereby shaping the corresponding portion of the duct, i.e. modifying its cross-sectional shape and/or its direction.

This avoids all problems associated with overmolding a sleeve of rigid material on a duct that is more or less deformable.

In a preferred embodiment of the invention, the above-specified pieces are half-cages made up of rigidly interconnected bars.

Each above-mentioned piece or half-piece is integrally molded out of a relatively rigid plastics material, e.g. out of glass fiber filled polyamide.

Finally, it may be advantageous to provide on said pieces or half-cages fastening means or means for receiving accessories such as abutments for bearing against a support or members for fixing on a support.

BRIEF DESCRIPTION OF THE DRAWINGS

The invention will be better understood and other characteristics, details, and advantages thereof will appear more clearly on reading the following description, given by way of example with reference to the accompanying drawings, in which:

FIGS. 4 and 5 are diagrams showing how the half-cages of the device appear prior to being assembled together, the half-cages of FIG. 4 being shown in section on line IV—IV of FIG. 2, and those of FIG. 5 being shown in section on line VI—VI of FIG. 2;

FIG. 6 is a diagrammatic perspective view of a half-cage constituting a variant embodiment; and FIG. 7 is a diagrammatic plan view of the half-cage of FIG. 6.

MORE DETAILED DESCRIPTION

Figure 1:
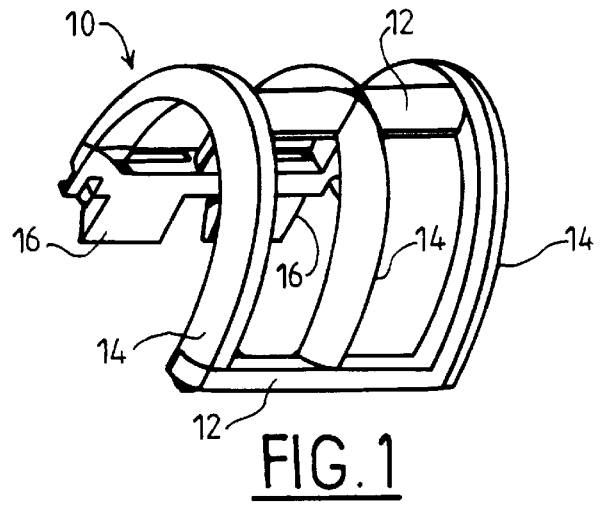
FIG. 1 is a diagrammatic perspective view of a half-cage of a device of the invention.
Figure 2:
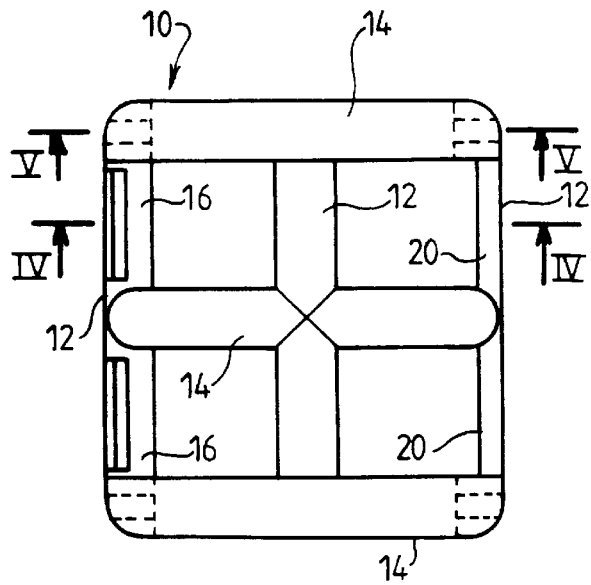
FIG. 2 is a plan view of said half-cage.
Figure 3:
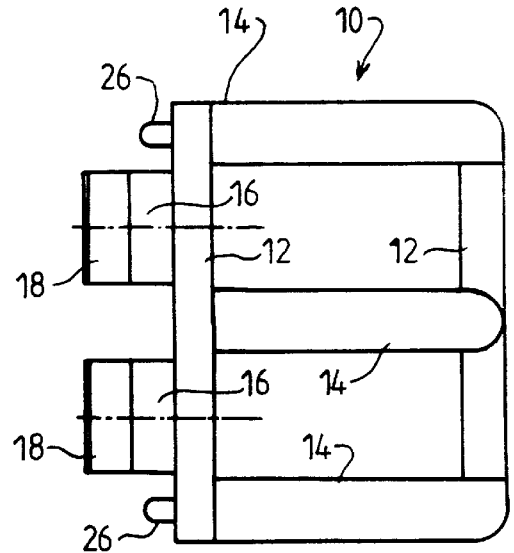
FIG. 3 is a view of the lefthand end of said cage as shown in FIG. 2.

Reference is made initially to FIGS. 1 to 5 which are diagrams of a first embodiment of the invention in which the device for shaping a duct or a pipe of plastics material that is made of elastomer or of rubber is itself constituted by two identical half-cages 10 that are suitable for being assembled together by resilient snap-fastening or hooking and that are suitable, when installed around a duct, for imparting an elliptical shape to its cross-section.

Each half-cage 10 is molded out of rigid plastics material, such as a polyamide filled with glass fibers, and it comprises three parallel rectilinear longitudinal bars 12 interconnected by three parallel transverse bars 14 each in the form of a half-ellipse. The transverse bars 14 are respectively at the ends and in the middle of the half-cage 10, and the respective longitudinal bars 12 interconnect the ends of the traverse bars 14 and the middle portions of said bars. One of the longitudinal bars 12 connected together the ends of the traverse bars 14 has two hook-forming tabs 16 each extending between two of the transverse bars 14 and away therefrom, tangentially to the half-ellipse defined by the half-cage 10, as can be seen clearly in FIG. 4.

Each tab 16 has a catch 18 projecting from its outside face, the catch 18 being in the form of half an arrowhead.

The other longitudinal bar 12 interconnecting the ends of the transverse bars 14 of the half-cage 10 has notches 20 on its inside face, said notches being designed to receive the tabs 16 together with their catches 18 of the identical other half-cage when the device is assembled.

The tranverse end bars 14 of the cage 10 are formed with respective projections 22 having a sloping ramp at one end and a notch 24 of complementary shape at the other end (FIG. 5). Finally, positioning pegs 26 may be formed at the ends of one of the longitudinal end bars 12 (FIG. 3) to project in the same direction as the tabs 16, while the other end longitudinal bar 12 has orifices for receiving the positioning pegs 26 of another identical half-cage.

The device of the invention is extremely simple to assemble:

It suffices to place two identical half-cages 10 so they face each other as shown in FIG. 4, with the tabs 16 of one half-cage being in alignment with the notches 20 of the other half-cage, and vice versa, and then to push the half-cages towards each other so as to cause the half-cage to fix together automatically by resilient snap-fastening and hooking, with the catches 18 of the tabs 16 sliding over the edges of the notches 20 until the bars 12 are resiliently snap-fastened together.

Any duct of circular cross-section that happens to be between the two half-cages 10 then takes up the elliptical shape that is defined by the half-cages when they are assembled together. The half-cages are made of a material that is sufficiently rigid and mechanically strong to ensure that it retains its shape even if the pressure inside the duct should become considerably greater than ambient pressure.

The device of the invention is easy to disassemble: all that needs to be done is to push the tab 16 inwards while pulling the half-cages 10 apart so that they separate.

The device of FIGS. 6 and 7 differs from that described above in that it makes it possible not only to modify the shape of the cross-section of the duct on which it is mounted, but also to modify the direction of the duct, e.g. by bending it through 45°.

As before, this device comprises two half-cages 30 that are identical or substantially identical, being made out of molded plastics material and being constituted by longitudinal bars 32 that extend parallel to each other and by transverse bars 34 in the form of half-ellipses, the longitudinal bars 32 being rectilinear over a portion of their length and curved along a circular arc in the vicinity of one end, such that a transverse bar 34 situated at one end of the half-cage is inclined at 45°, for example, relative to the transverse bar 34 situated at the opposite end of the half-cage.

The longitudinal bars 32 are parallel to the longitudinal axis of symmetry a of the device and the transverse bars 34 extend in planes perpendicular to said axis.

To reinforce the half-cage, a transverse half-bar 36 is provided in the form of one-fourth of an ellipse between the two transverse bars 34 that interconnect the curved portions of the longitudinal bars 32, said transverse half-bar 36 extending between the longitudinal bar 32 that is situated radially outwardly relative to the center of curvature of the curved ends of the bars 32, and the longitudinal bar 32 interconnecting the middles of the transverse bars 34.

The variant embodiment shown in FIGS. 6 and 7 also differs from that of FIGS. 1 to 5 in that it comprises a male type half-cage having resilient snap-fastening or hooking means such as the tabs 16 of the preceding embodiment, while the other half-cage is of the female type having notches for receiving the resilient snap-fastening or hooking means, with the half-cage 30 that is shown in FIGS. 6 and 7 being of the female type.

In addition, the half-cage 30 has pegs 38 that project from one of the longitudinal bars 32, e.g. to receive a rubber shoe that is used as a bearing abutment on a support.

Naturally, it is possible to provide the half-cages 10 or 30 with other suitable means for fastening or engaging abutment or fastening members on the supports.

In both above-described embodiments, the faces of the bars 12, 14, 32, 34 that face towards the insides of the half-cages are substantially plane or slightly curved and tangential to the surface of elliptical section defined by the half-cages.

The number of bars, their sizes, and the material from which they are made depend on the stresses to which the device of the invention is to be subjected. The same applies to the number and sizes of the resilient snap-fastening or hooking means.

In general, the invention makes it possible simply, quickly, and reliably, to shape a duct or pipe of plastics material or of elastically deformable material by means of a device that can be installed and removed without using special tools.

Naturally, the half-cages as described above may be replaced by half-shells having solid walls or walls that are perforated to a greater or lesser extent. Similarly, the device of the invention may be constituted by assembling and fastening together more than two pieces, and it may be designed to modify both the direction and/or the shape of a duct, e.g. to impart an S-shape or a U-shape to a portion of a duct, should that be required.

We claim:

1. In combination, a duct of plastics material or of elastically deformable material having an initial cross-sectional shape, and a device for shaping said duct comprising a housing adapted for receiving a portion of the duct and being of a cross-sectional shape that corresponds to a cross-sectional shape desired for said portion of the duct, said desired cross-sectional shape being different from the initial cross-sectional shape of the duct, the housing being constituted by at least two rigid pieces provided with means for fastening one to the other and with means for deforming the said portion of the duct and giving it the said desired cross-sectional shape when said pieces are fastened one to the other.

2. A device according to claim 1, wherein the means for fastening the pieces together are resilient snap fastening or hooking means.

3. A device according to claim 1, wherein the said pieces are half-cages made up of rigidly interconnected bars.

4. A device according to claim 1, wherein each piece os integrally molded out of a relatively rigid plastics material.

5. A device according to claim 4, wherein the plastics material of said pieces is a glass fiber filled polyamide.

6. A device according to claim 1, wherein the said pieces comprise means for fastening or receiving members for bearing against a support or for fastening onto a support.

7. A device according to claim 1, wherein the shape of said housing is elliptical in section.

8. A device according to claim 1, wherein the said housing is curved in shape, corresponding to at least one change in direction of the duct.

9. A device according to claim 1, wherein the said pieces are made up of longitudinal bars parallel to a longitudinal axis of the housing and of curved transverse bars that are substantially perpendicular to said axis.

* * * * *